(12) United States Patent
Zhang et al.

(10) Patent No.: US 10,069,640 B2
(45) Date of Patent: Sep. 4, 2018

(54) METHODS AND DEVICES FOR ADDING NEW MEMBER TO GROUP THROUGH BARCODE SCANNING

(71) Applicant: Tencent Technology (Shenzhen) Company Limited, Shenzhen (CN)

(72) Inventors: Xiaolong Zhang, Shenzhen (CN); Zhenan Guan, Shenzhen (CN); Yingxia Lin, Shenzhen (CN); Keren Li, Shenzhen (CN); Ming Zeng, Shenzhen (CN); Tianqing Huang, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 593 days.

(21) Appl. No.: 14/095,929

(22) Filed: Dec. 3, 2013

(65) Prior Publication Data
US 2014/0156757 A1 Jun. 5, 2014

Related U.S. Application Data

(63) Continuation of application No. PCT/CN2013/085365, filed on Oct. 17, 2013.

(30) Foreign Application Priority Data

Dec. 5, 2012 (CN) .......................... 2012 1 0516896

(51) Int. Cl.
*G06F 15/16* (2006.01)
*H04L 12/18* (2006.01)

(52) U.S. Cl.
CPC ............................... *H04L 12/1822* (2013.01)

(58) Field of Classification Search
CPC ...... H04L 12/1822; H04L 51/32; G06Q 50/01
See application file for complete search history.

(56) References Cited

U.S. PATENT DOCUMENTS

| 7,774,010 B2* | 8/2010 | Kokkonen ............ H04L 41/042 |
| | | 370/260 |
| 9,100,453 B2* | 8/2015 | Chen ....................... H04L 63/08 |
| (Continued) | | |

FOREIGN PATENT DOCUMENTS

| CN | 101047703 A | 10/2007 |
| CN | 101094233 A | 12/2007 |
| (Continued) | | |

OTHER PUBLICATIONS

Tencent Technology, ISRWO, PCT/CN2013/085365, dated Jan. 23, 2014, 7 pgs.

(Continued)

*Primary Examiner* — Anthony Mejia
*Assistant Examiner* — Dixon Dabipi
(74) *Attorney, Agent, or Firm* — Morgan, Lewis & Bockius LLP

(57) ABSTRACT

The current invention discloses methods and devices for adding a new member to a group, e.g. a chat group associated with a chat program. The new member may be added through a barcode-scanning process or an existing-member-invitation process. After the new member is added to the chat group, a server may send notification messages to mobile devices associated with the existing members of the group. The contents of the notification messages may vary based on the processes by which the new member is added, the number of existing members, and the direct-contact relationships the new member has with the existing members. The current invention provides simplified methods and (Continued)

devices for adding the new member, avoiding cumbersome operations and protecting member privacy at the same time.

7 Claims, 5 Drawing Sheets

(56) References Cited

U.S. PATENT DOCUMENTS

| | | | | |
|---|---|---|---|---|
| 9,769,611 B2* | 9/2017 | Holden | ............... | H04W 4/023 |
| 2007/0019616 A1* | 1/2007 | Rantapuska | ........ | H04L 12/1822 |
| | | | | 370/352 |
| 2007/0198647 A1* | 8/2007 | Lingafelt | ............ | H04L 12/1822 |
| | | | | 709/207 |
| 2009/0060201 A1* | 3/2009 | Rhodes | .................. | G06F 21/62 |
| | | | | 380/279 |
| 2010/0259549 A1* | 10/2010 | Brown | ................... | G06F 21/36 |
| | | | | 345/589 |
| 2010/0262924 A1* | 10/2010 | Kalu | ...................... | H04L 12/581 |
| | | | | 715/753 |
| 2010/0281520 A1* | 11/2010 | Deguchi | ................ | G06F 21/31 |
| | | | | 726/3 |
| 2011/0010340 A1* | 1/2011 | Hung | ................. | H04L 12/1886 |
| | | | | 707/623 |
| 2011/0264527 A1* | 10/2011 | Fitzpatrick | ............ | G06Q 30/02 |
| | | | | 705/14.55 |
| 2011/0307340 A1 | 12/2011 | Benmbarak | | |
| 2011/0307397 A1* | 12/2011 | Benmbarek | ............ | G06Q 50/01 |
| | | | | 705/319 |
| 2012/0173638 A1* | 7/2012 | Vymenets | ............ | G06Q 10/103 |
| | | | | 709/206 |
| 2012/0211557 A1 | 8/2012 | Harris | | |
| 2012/0217296 A1 | 8/2012 | Merel | | |
| 2013/0031100 A1* | 1/2013 | Graham | .................. | H04L 51/32 |
| | | | | 707/739 |
| 2013/0073974 A1* | 3/2013 | Bladel | .................... | G06Q 50/01 |
| | | | | 715/739 |
| 2014/0171039 A1* | 6/2014 | Bjontegard | ....... | H04L 29/06034 |
| | | | | 455/414.1 |
| 2014/0331282 A1* | 11/2014 | Tkachev | ................ | H04L 63/08 |
| | | | | 726/3 |

FOREIGN PATENT DOCUMENTS

| | | |
|---|---|---|
| CN | 101271548 A | 9/2008 |
| CN | 101369985 A | 2/2009 |
| CN | 102333285 A | 1/2012 |
| TW | 200912787 A | 3/2009 |
| WO | WO 2012019293 A1 | 2/2012 |

OTHER PUBLICATIONS

Tencent Technology, IPRP, PCT/CN2013/085365, dated Jun. 9, 2015, 5 pgs.

* cited by examiner

METHODS AND DEVICES FOR ADDING NEW MEMBER TO GROUP THROUGH BARCODE SCANNING

RELATED APPLICATIONS

This application is a continuation application of PCT Patent Application No. PCT/CN2013/085365, entitled "Methods and Devices for Adding New Member to Group Through Barcode Scanning" filed on Oct. 17, 2013, which claims priority to Chinese Patent Application No. 201210516896.X, "Methods and Devices for Adding New Member to Group Through Barcode Scanning," filed on Dec. 5, 2012, both of which are hereby incorporated by reference in their entirety.

FIELD OF THE INVENTION

The present invention relates to the instant messaging field, especially involving methods and devices for joining the group through a barcode.

BACKGROUND OF THE INVENTION

The chat group technology and its functions have become the foundations for a number of instant messaging chat programs. Presently, for a new member to join a group, the following method is used: the group host member or administrator establishes a group and distributes the group number associated with the group to users who find the group; the users apply for joining the group using the group number; then the group host member or administrator verifies and determines whether the applicant is approved using access control verifications. However, the method of joining the group using the group number involves cumbersome operations and complex processes. Moreover, in the mobile internet era, a large number of users conduct operations through mobile terminals, which makes it more inconvenient to search for the group number and apply for joining the group.

Accordingly, it is necessary and desirable to provide a new technology, so as to resolve the technical problem and improve the above-mentioned method to add a new member to a group, reducing the complexity of operation and making the process more convenient for mobile terminal users.

SUMMARY

The above deficiencies and other problems associated with adding a member to a group are reduced or eliminated by the invention disclosed below. In some embodiments, the invention is implemented in a computer system that has one or more processors, memory and one or more modules, programs or sets of instructions stored in the memory for performing multiple functions. Instructions for performing these functions may be included in a computer program product configured for execution by one or more processors.

One aspect of the invention involves a computer-implemented method performed by a server. The server receives a joining request to add a new member to the chat group, wherein the joining request is sent by a first mobile device associated with the new member using a barcode-scanning process or by a second mobile device associated with a first existing member using an existing-member-invitation process. The barcode-scanning process may comprise: scanning a barcode encoding chat group information corresponding to the chat group using the first mobile device; decoding the barcode using a barcode decoding module to obtain the chat group information corresponding to the chat group; and generating the joining request based on the chat group information. The existing-member-invitation process may comprise: sending an invitation to the new member to join the chat group using the second mobile device, wherein the new member has a direct-contact relationship with the first existing member; and generating the joining request based on the invitation. Then, the server may add the new member to the chat group without further authorization from the existing members of the chat group. Moreover, based on whether the new member is added to the chat group through the barcode-scanning process or the existing-member-invitation process, the server may send corresponding notification messages to the existing members of the chat group.

Another aspect of the invention involves a computer system. The computer system comprises a server and one or more mobile devices, the server having: one of more processors; memory; and one or more program modules stored in the memory and configured for execution by the one or more processors, the one or more program modules including: a receiving module configured to receive a joining request to add a new member to a chat group having one or more existing members, wherein the joining request is sent by a first mobile device associated with the new member using a barcode-scanning process or by a second mobile device associated with a first existing member using an existing-member-invitation process, wherein: the barcode-scanning process comprises: scanning a barcode encoding chat group information corresponding to the chat group using the first mobile device; decoding the barcode using a barcode decoding module to obtain the chat group information corresponding to the chat group; and generating the joining request based on the chat group information, and the existing-member-invitation process comprises: sending an invitation to the new member to join the chat group using the second mobile device, wherein the new member has a direct-contact relationship with the first existing member; and generating the joining request based on the invitation, an addition module configured to add the new member to the chat group without further authorization from the existing members of the chat group; a determination module comprises a process determining subunit configured to determine whether the new member is added to the chat group through the barcode-scanning process or the existing-member-invitation process; and a notifying module configured to send corresponding notification messages to the existing members of the chat group based on whether the new member is added to the chat group through the barcode-scanning process or the existing-member-invitation process.

Another aspect of the invention involves a non-transitory computer readable storage medium having stored therein instructions, which, when executed by a server, cause the server to: receive a joining request to add the new member to the chat group, wherein the joining request is sent by a first mobile device associated with the new member using a barcode-scanning process or by a second mobile device associated with a first existing member using an existing-member-invitation process, wherein: the barcode-scanning process comprises: scanning a barcode encoding chat group information corresponding to the chat group using the first mobile device; decoding the barcode using a barcode decoding module to obtain the chat group information corresponding to the chat group; and generating the joining request based on the chat group information, and the existing-member-invitation process comprises: sending an invitation to the new member to join the chat group using the second mobile device, wherein the new member has a direct-contact relationship with the first existing member; and generating the joining request based on the invitation, add the new member to the chat group without further authorization from the existing members of the chat group; and send corresponding notification messages to the existing members of the chat group based on whether the new member is added to the chat group through the barcode-scanning process or the existing-member-invitation process.

Some embodiments may be implemented on either the client side or the server side of a client-server network environment.

BRIEF DESCRIPTION OF THE DRAWINGS

The aforementioned features and advantages of the invention as well as additional features and advantages thereof will be more clearly understood hereinafter as a result of a detailed description of preferred embodiments when taken in conjunction with the drawings.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

Figure 1:
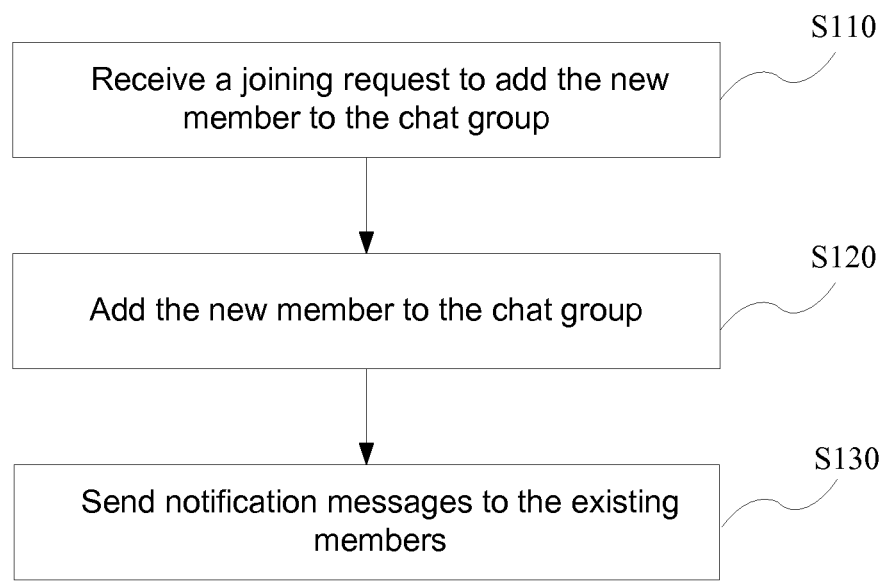
FIG. 1 is a flowchart illustrative of a method for adding a new member to a group in accordance with some embodiments of the current invention.

FIG. 1 is a flowchart illustrative of a method for adding a new member to a group in accordance with some embodiments of the current invention. The new member may be associated with a mobile device and the group may be managed with a server. The group may be a chat group and may have one or more existing members each associated with a mobile device.

Referring to FIG. 1, Step S110 shows that the server may receiving a joining request to add the new member to the chat group, wherein the joining request may be sent by a first mobile device associated with the new member using a barcode-scanning process or by a second mobile device associated with a first existing member using an existing-member-invitation process. The details of the barcode-scanning process and the existing-member-invitation process are described in detail in FIGS. 2 and 5.

Step S120 shows that the server may add the new member to the chat group without further authorization from the existing members of the chat group.

Step S130 shows that the server may send corresponding notification messages to the existing members of the chat group based on whether the new member is added to the chat group through the barcode-scanning process or the existing-member-invitation process.

Figure 2:
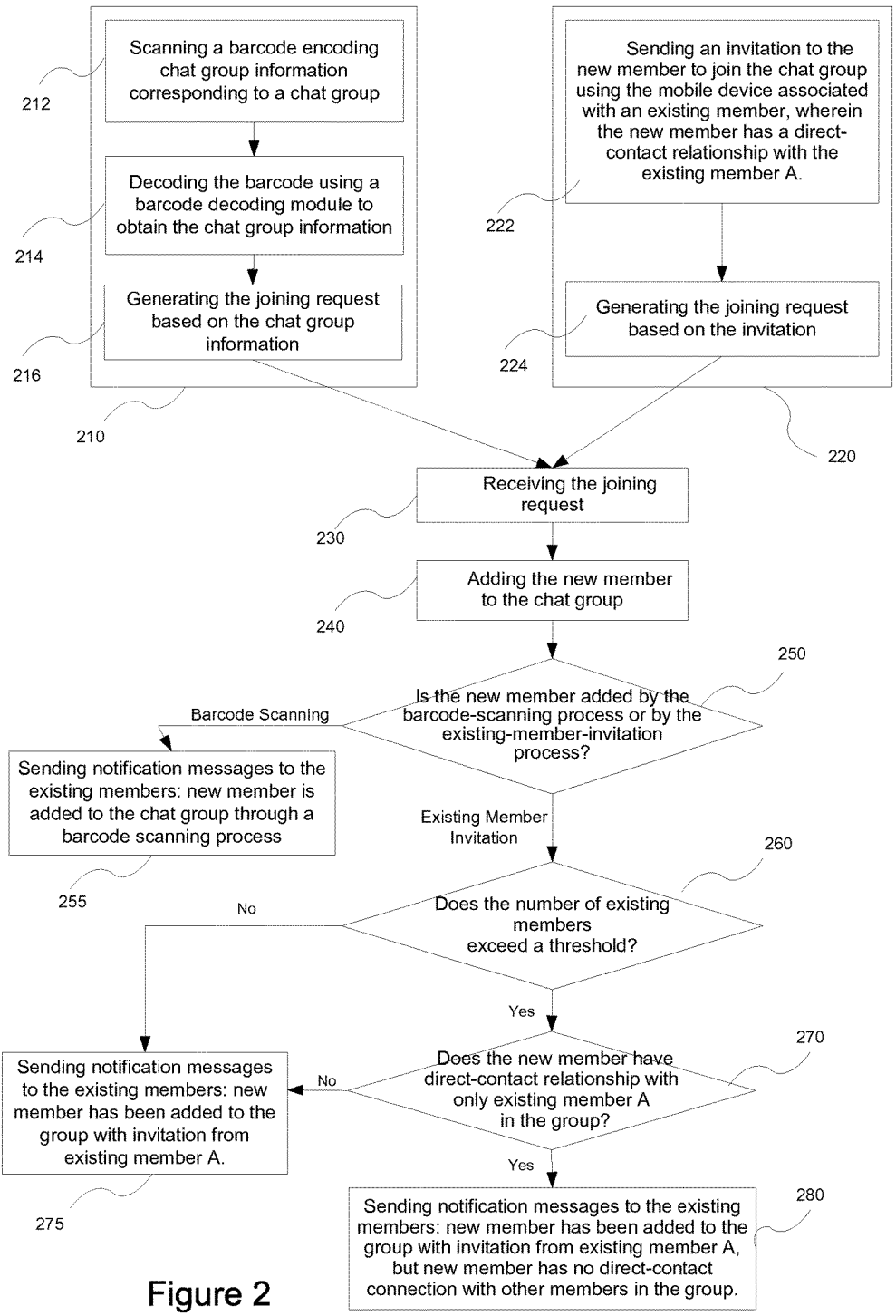
FIG. 2 is a detailed flowchart illustrative of the method for adding a new member to a group in accordance with some embodiments of the current invention.

FIG. 2 is a detailed flowchart illustrative of the method for adding a new member to a group in accordance with some embodiments of the current invention.

As indicated above, the new member may be added with the barcode-scanning process. Referring to FIG. 2, the barcode-scanning process 210 may be conducted by a mobile device associated with the new member and barcode-scanning process 210 may comprise: step 212—scanning a barcode encoding chat group information corresponding to the chat group using the mobile device; step 214—decoding the barcode using a barcode decoding module to obtain the chat group information corresponding to the chat group; and step 216—generating the joining request based on the chat group information. In addition, before the barcode is scanned, the barcode may be distributed to or shared with the mobile device associated with the new member.

The mobile devices associated with the new member or the existing members may be any kind of mobile computing devices, such as but not limited to smart phones, tablets, and laptop computers. It is also desirable that the mobile device has a camera or is equipped with a scanning device, so that the mobile device may be used to scan the barcode corresponding to the group.

As implemented in the current invention, the barcode can be a one-dimensional barcode, a two-dimensional barcode, a three-dimensional barcode, a color barcode and so on, or other patterns or barcodes that may be converted and decoded to obtain group information such as group number(s). The one-dimensional barcode, two-dimensional barcode or three-dimensional barcode may have color or may be black and white. The color barcode can be a Microsoft high capacity color barcode. In particular, two-dimensional barcodes are barcodes that store information in horizontal and vertical two-dimensional spaces, and two-dimensional barcodes may include stacked-linear two-dimensional barcodes, matrix two-dimensional barcodes and postal barcodes such as intelligent mail barcodes, PLANET barcodes, and POSTNET barcodes. The two-dimensional barcode may be used as an example to illustrate the current invention.

The two-dimensional barcode may encode chat group information, which may include group number and a group host. The administrator or existing group members may share and distribute the two-dimensional barcode corresponding to the group. In some implementations, the two-dimensional barcode can be shared and distributed through e-mail, social media such as blogs, Facebook®, Micro-blog, and Twitter, image-sharing services, or other distribution channels. The specific channels for sharing and distributing of the two-dimensional barcode may be selected according to the users' needs. For example, in some implementations, if it is desirable to control the distribution speed, it is probably not advisable to distribute the two-dimensional barcode of the group with Micro-blog or other non-discriminatory tools, in order to avoid excessive number of persons trying to join the group.

Different two-dimensional barcodes have different conversions and analytic algorithms. In general, the two-dimensional barcodes are used to record data symbol information by some specific geometrical patterns according to black-white patterns which are distributed regularly on a plane (two-dimensional direction); as for the barcode compilation, it utilizes the concepts of "0", "1" bitstreams which form internal logic bases of a computer and uses several geometrical patterns related to the binary system to show text and numerical information. In step 212, new members who intend to join the group can scan the two-dimensional barcode through image input equipment or photoelectric scanning device, then decode the barcode using a barcode decoding module (algorithm) to obtain the chat group information.

In some embodiments, the chat group information may include a chat group number corresponding to the chat group. Using the chat group number, as shown in Step 216, the mobile device associated with the new member may generate a joining request and send the joining request to the server. The joining request may comprise the chat group information and new member information corresponding to the new member. The new member information may include information items such as nicknames, identifying numbers, and icons for the new member.

As indicated above and as an alternative to the barcode-scanning process, the joining request may be generated by an existing-member-invitation process 220, which may be conducted by a mobile device associated with an existing member. Referring to FIG. 2, Step 222: an existing member A may send an invitation to the new member to join the chat group using the mobile device associated with the existing member, wherein the new member has a direct-contact relationship with the existing member A; Step 224: the mobile device associated with the existing member A may generate the joining request based on the invitation.

The direct-contact relationship may be any kind of relationship that allows the new member and the existing member to communicate directly and privately. In some embodiments, the direct-contact relationship may be a one-to-one contact relationship. In some embodiments, the direct-contact relationship may be a direct-contact relationship associated with an instant messaging or chat program, such as but not limited MSN®, QQ®, and WeChat®. In some programs, the direct-contact relationship may be called "good-friend" or "buddy" relationships. The direct-contact relationship may be established by either the request from the existing member or the new member.

Referring to FIG. 2, after the joining request is generated and sent to the server, Step 230 shows that the server may receive the joining request and Step 240 shows that the server may add the new number to the chat group. For some implementations, when the request is generated by the barcode-scanning process or when the request is generated by the existing-user invitation process but the existing user is not the group host or administrator, the joint request may be further examined by the group host or administrator to decide whether the request should be granted. Such an approach maintains a higher level of privacy but can put significant burden on the group host or administrator, especially when there are numerous joining requests. Alternatively, the joining request, once generated and received, may be automatically granted and the addition of the new member may take place without any further authorization by the existing members of the chat group. Such an approach avoids the sometimes cumbersome procedure of administrator (group host) authorization. However, in some cases, the no-further-authorization procedure may cause concern for privacy. The current invention provides a layered notification process to address such concerns.

An optional step of new member authorization may be added to the process when the joining request is generated by the existing-member-invitation process. With such a step, after the joining request is generated, the request may be sent to the server only with the authorization of the new member. In addition, the joining request may be sent either by the device associated with the existing member or by the device associated with the new member. The new member authorization step allows the new member to confirm the willingness to join the group. However, this step is optional because it may cause delay to the process.

As indicated by FIG. 1, after adding the new member to the group, the server may send out notification messages to the existing members. The contents of the notification messages may vary according to specific scenarios and setups, with the emphasis of providing notice to the existing members regarding how the new member joined the chat group.

Referring to FIG. 2, Step 250 shows that the server may inquire as to whether the new member is added by the barcode-scanning process or the existing-member-invitation process. As shown by Step 255, if the new member is added by the barcode-scanning process, the notifying messages to the existing members may indicate that new member is added to the chat group through a barcode-scanning process.

Referring to FIG. 2, Steps 260, 270, 275, and 280 show that the server may make further inquiries when the new member is added by the existing-member-invitation process. As shown by Step 260, the server may examine whether the number of existing members exceeds a threshold. For example, if the threshold is 5 and the number of existing members is 4 (or any number ≤5), then the server proceeds to Step 275; if the threshold is 5 and the number of existing members is 6 (or any number >5), then the server proceeds to Step 270.

As shown by Step 275, when the number of existing members does not exceed the threshold, the notification messages to the existing members indicate that the new member has been added to the group with invitation from the existing member A—the existing member that sent the invitation to the new member.

As shown by Step 270, when the number of existing members exceeds the threshold, a further inquiry is made to ask whether the new member has direct-contact relationship with only the existing member A—the existing member that sent the invitation to the new member—before the new member is added to the chat group. As shown by Step 275, if the new member has a direct-contact relationship with any of the existing members other than the existing member A before being added to the chat group, the notification messages may indicate that the new member has been added by invitation from the existing member A. On the other hand, as shown by Step 280, if the new member does not have a direct-contact relationship with the existing members other than existing member A before being added to the chat group, the notification messages may indicate that the new member has been added by invitation from the existing member A and that the new member does not have a direct-contact relationship with the other existing members.

The process shown by Steps 250, 255, 260, 270, 275, and 280 ensures that the existing members may get proper notice as to a new member is added to the group and how that new member is added, protecting the privacy of the members and avoiding a complicated procedure. In particular, when the new member is added through the barcode-scanning process, the existing members are notified accordingly—sending an implied message that it is possible that the new member is a stranger not known by any of the existing members. In addition, the notification messages may indicate that the new member is added by existing member invitation and that the new member does not have a direct—contact relationship with the other exiting members only when two conditions are satisfied: (1) the number of existing members is still relatively small—the number does not exceed a threshold; and (2) the new member does not have a direct-contact relationship with the other existing members except the existing member sending out the invitation. Such an approach also send the implied message that although the new member has a direct-contact relationship with one existing member, the new member may be a stranger to the other existing members.

With proper notifications, the existing members may act accordingly. For example, the existing members may ask the group host or administrator to further examine the identity of the new member or even remove the new member from the group; or the existing members may alter their own behavior during group activities to make sure that no improper or private matters are disclosed in the group. In such a manner, the current invention provides protection to the privacy of the members.

Figure 5:
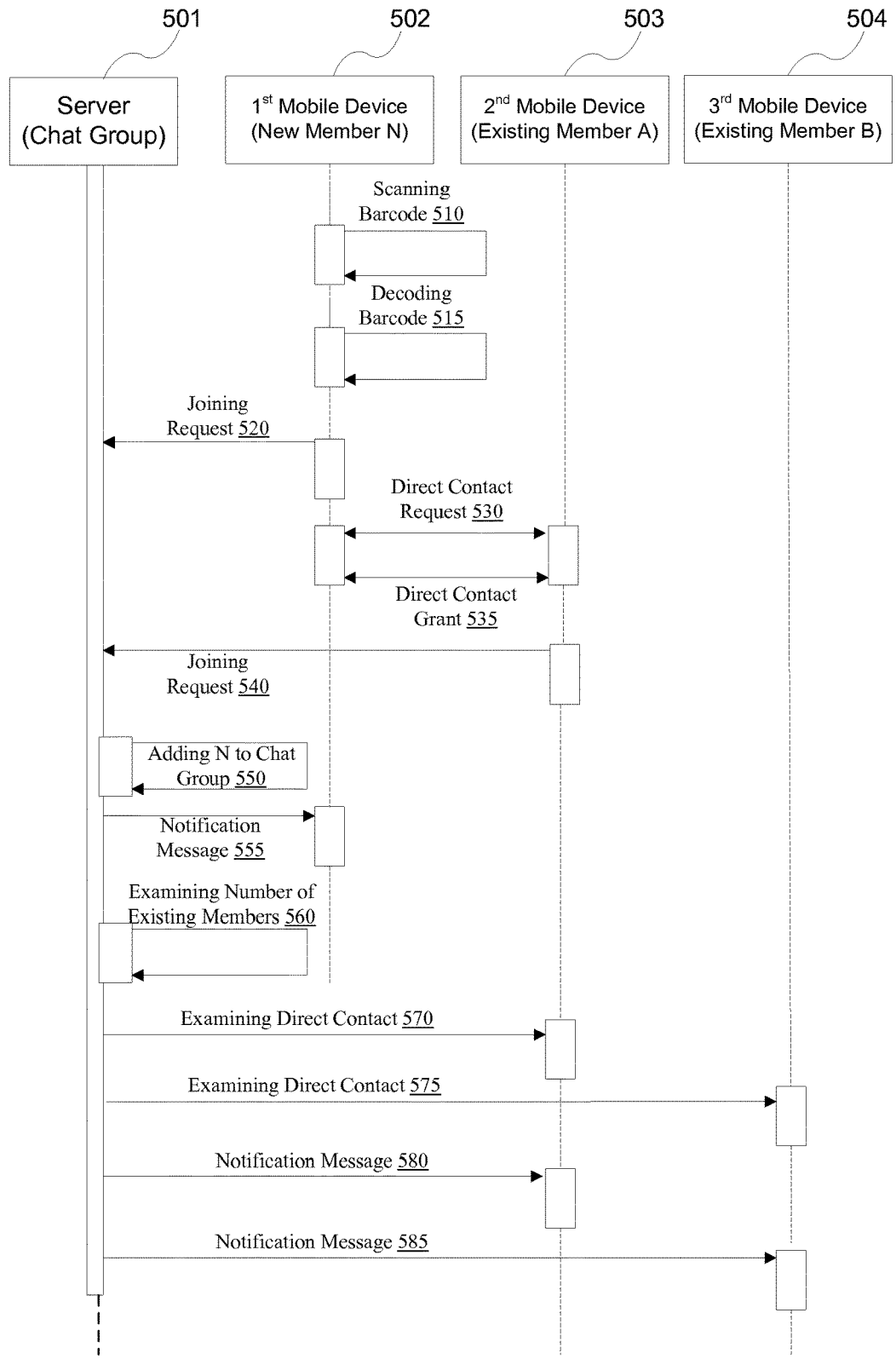
FIG. 5 is a schematic illustration of how a server, a mobile device associated with a new member, and two other mobile devices associated with two existing members interact to add the new member to the group in accordance with some embodiments of the current invention.

FIG. 5 is a schematic illustration of how a server 501 associated with a chat group, a first mobile device 502 associated with a new member, and two other mobile devices 503 and 504 associated with two existing members interact to add the new member to the group in accordance with some embodiments of the current invention. In essence, FIG. 5 provides an example for the process shown in FIG. 2. It should be noted that the actions shown in FIG. 5 are only exemplary and may be altered according to specific setups of the group, the members, and the devices associated with the members. For example, the number of servers and the existing members may vary. In addition, there is no limitation as to how many devices may be associated with the new member and each existing member. Similarly, there is no limitation as to how many members may be associated a single device. In addition, the server may also be a device associated with one of the members of the group.

As shown by FIG. 5, the first mobile device 502 associated the new member N may scan a barcode in step 510 and decode the barcode in step 515 to acquire chat group information, before a joining request 520 is generated by the first mobile device 502 and sent to the server 501. These steps correspond to the bar-code scanning process 210 in FIG. 2.

As indicated in FIG. 2, the joining request may also be generated by the existing-member-invitation process 220. Referring to FIG. 5, the new member N may establish a direct contact relationship with an existing member, e.g. existing member A, through interactions of the first mobile device 502 associated with the new member N and the second mobile device 503 associated with the existing member A. The direct contact relationship may be established by a request-grant process: the first mobile device 502 or the second mobile device 503 send a direct contact request 530 to the other, and the second mobile device 503 or the first mobile device 502 reply with a direct contact grant 535. After the direct contact relationship is established, the second mobile device 503 may generate a joining request 540 and send the joining request 540 to the server 501. In some embodiment, it is possible that the joining request 540 is sent from the first mobile device 502 associated with the new member N. It should also be noted that preferably the joining requests 520 and joining request 540 are generated by alternative processes, not sequential events.

After the server 501 receives the joining requests 520 or 540, the server 501 adds the new member N to the chat group in step 550, preferably without further authorization from the existing members of the chat group. Optionally, the server 501 may send a notification message 555 to the first mobile device 502 associated with the new member. The contents of the notification message 555 may be the same or different as the notification messages 580 and 585 sent to the existing members of the chat group.

The server 501 may examine the number of existing members in step 560. Steps 550 and 560 may or may not involve devices other than the server 501. To perform steps 550 and 560, the server may edit or examine information or tables associated with the chat group, wherein the information or tables may be stored in a database that can be accessed by the server 501.

As shown in steps 570 and 575, the server 501 may also examine the direct-contact relationships maintained by the existing members of the chat group: existing member A and existing member B. The examination may or may not involve the second or third mobile devices 503 and 504. In some embodiments, the server 501 may have complete lists of the existing members' direct contacts stored on the server 501. In such cases, there is no need for the server to access the second and third mobile devices 503 and 504. In some embodiments, the server 501 may need to access the contact lists on the second and third mobile devices 503 and 504 to examine the direct contact relationships.

The server 501 may send notification messages 580 and 585 to the mobile devices 503 and 504 associated with the existing member A and existing member B, respectively. The notification messages 580 and 585 may be the same or different.

As indicated above, if the new member is added by the barcode-scanning process, the notification messages 580 and 585 may indicate that the new member has been added by scanning the barcode. If the new member N is added by the existing-member-invitation process, and if the number of existing members does not exceed the threshold, the notification messages 580 and 585 may indicate that the new member N has been added by invitation from the existing member A. Similarly, if (1) the new member N is added by the existing-member-invitation process, (2) the number of existing members exceeds the threshold, and (3) the new member N has a direct-contact relationship with any of the existing members other than the existing member A before being added to the chat group, the notification messages 580 and 585 may indicate that the new member has been added by invitation from the existing member A. On the other hand, if (1) the new member N is added by the existing-member-invitation process, (2) the number of existing members exceeds the threshold, and (3) the new member N does not have a direct-contact relationship with the existing members other than the existing member A before being added to the chat group, the notification messages 580 and 585 may indicate that the new member has been added by invitation from the existing member A and that the new member N does not have a direct-contact relationship with the other existing members.

Figure 3:
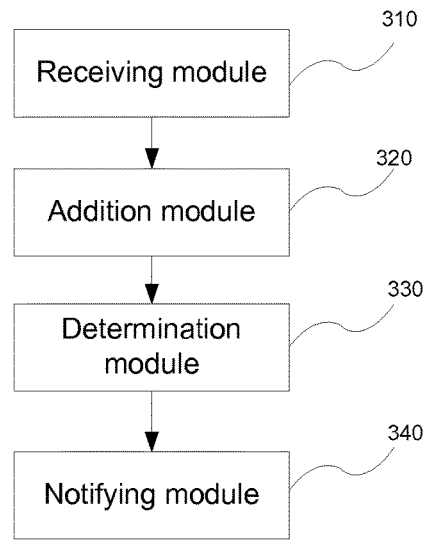
FIG. 3 is a block diagram illustrative of a server comprising modules configured to add a new member to a group in accordance with some embodiments of the current invention.
Figure 4:
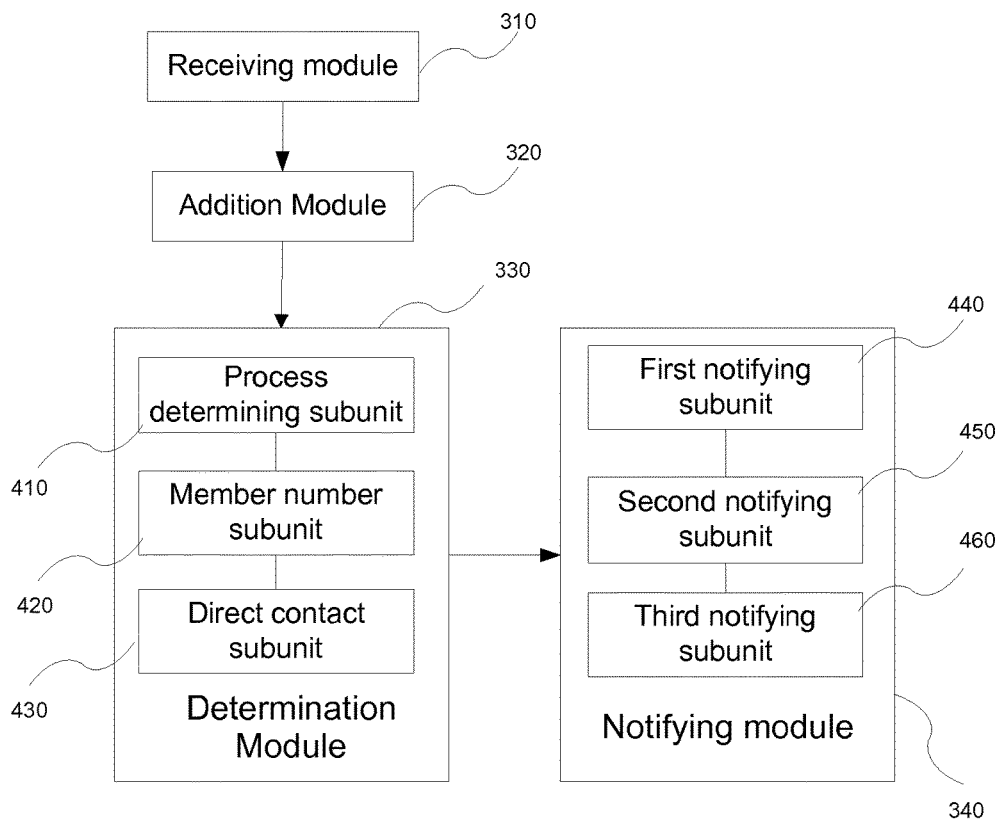
FIG. 4 is a block diagram illustrative of a server comprising modules configured to add a new member to a group in accordance with some embodiments of the current invention, providing more details for the determination module and the notifying module.
Figure 6:
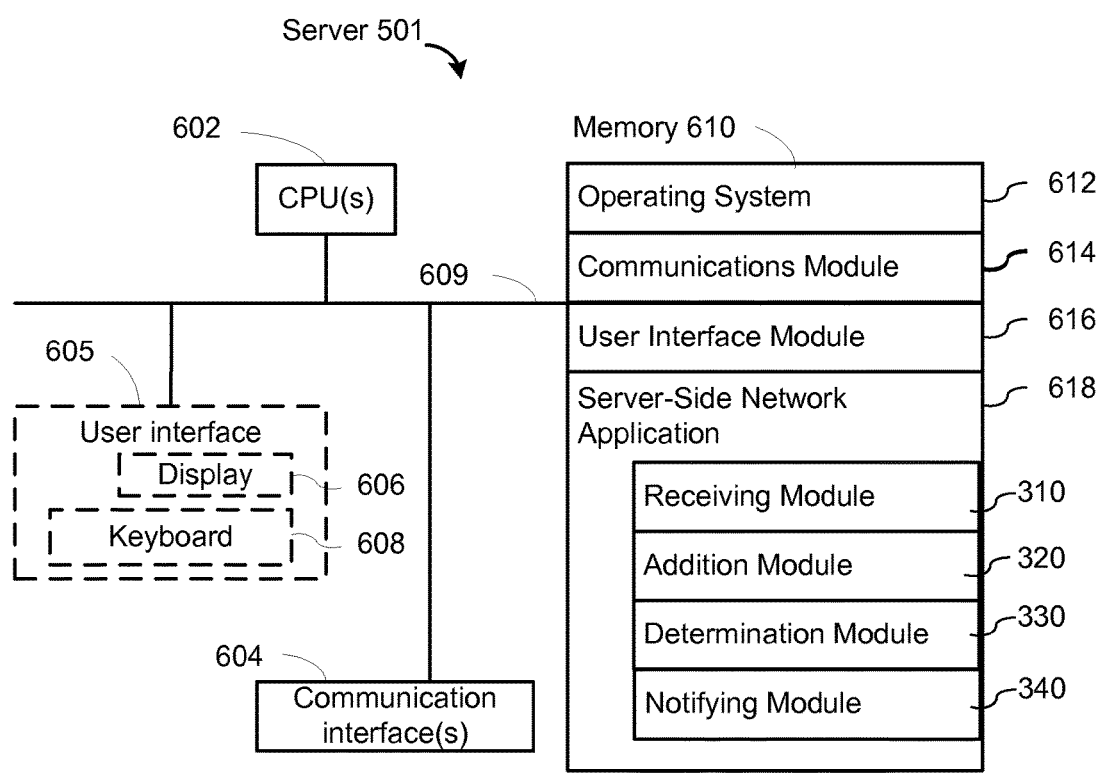
FIG. 6 is a block diagram of a server in accordance with some embodiments of the current invention.

FIGS. 3-4 and 6 illustrate the computer systems that may be used to perform the methods described above. To avoid redundancy, not all the details and variations described for the method are herein included for the devices. Such details and variations should be considered included for the description of the devices as long as they are not in direct contradiction to the specific description provided for the methods.

FIG. 3 is a block diagram illustrative of a server comprising modules configured to add a new member to a group in accordance with some embodiments of the current invention. The server may have one of more processors; memory; and one or more programs modules stored in the memory and configured for execution by the one or more processors, the one or more program modules including: a receiving module 310 configured to receive a joining request to add a new member to a chat group having one or more existing members, wherein the joining request is sent by a first mobile device associated with the new member using a barcode-scanning process or by a second mobile device associated with a first existing member using an existing-member-invitation process; an addition module 320 configured to add the new member to the chat group without further authorization from the existing members of the chat group; a determination module 330 configured to determine whether the new member is added to the chat group through the barcode-scanning process or the existing-member-invitation process; and a notifying module 340 configured to send corresponding notification messages to the existing members of the chat group based on whether the new member is added to the chat group through the barcode-scanning process or the existing-member-invitation process, wherein: the barcode-scanning process comprises: scanning a barcode encoding chat group information corresponding to the chat group using the first mobile device; decoding the barcode using a barcode decoding module to obtain the chat group information corresponding to the chat group; and generating the joining request based on the chat group information, and the existing-member-invitation process comprises: sending an invitation to the new member to join the chat group using the second mobile device, wherein the new member has a direct-contact relationship with the first existing member; and generating the joining request based on the invitation.

FIG. 4 is a block diagram illustrative of a server comprising modules configured to add a new member to a group in accordance with some embodiments of the current invention, providing more details for the determination module 330 and the notifying module 340.

Similar to FIG. 3, FIG. 4 shows the receiving module 310 and the addition module 320. In addition, FIG. 4 also shows a more detailed structure of the determination module 330, which comprises: a process determining subunit 410 configured to determine whether the new member is added to the chat group through the barcode-scanning process or the existing-member-invitation process; a member number subunit 420 configured to examine whether the number of existing members exceeds a threshold if the new member is added by the existing-member-invitation process; and a direct contact subunit 430 configured to examine whether the new member has a direct-contact relationship with the existing members other than the first existing member before being added to the chat group if the number of existing members exceeds the threshold.

FIG. 4 also shows more detailed structures of the notifying module 340, which comprises: a first notifying subunit 440 configured to send notification messages indicating that the new member has been added by scanning the barcode if the new member is added by the barcode-scanning process; a second notifying subunit 450 configured to send notification messages indicating that the new member has been added by invitation from the first existing member if the number of existing members does not exceed the threshold; and a third notifying subunit 460 configured to send notification messages indicating that the new member has been added by invitation from the first existing member and that the new member does not have a direct-contact relationship with the other existing members if the new member does not have a direct-contact relationship with the existing members other than the first existing member before being added to the chat group. In addition, the second notifying subunit 450 is further configured to send notification messages indicating that the new member has been added by invitation from the first existing member if the new member has a direct-contact relationship with any of the existing members other than the first existing member before being added to the chat group FIG. 6 is a block diagram of a server 501 in accordance with some embodiments of the current invention. The exemplary server 501 typically includes one or more processing units (CPU's) 602, one or more network or other communications interfaces 604, memory 610, and one or more communication buses 609 for interconnecting these components. The communication buses 609 may include circuitry (sometimes called a chipset) that interconnects and controls communications between system components. The server 501 may include a user interface 605, for instance, a display 606 and a keyboard 608. When the server 501 is a smart phone or tablet, the user interface 605 may be a touch screen, which is both a display and an input device. Memory 610 may include high speed random access memory and may also include non-volatile memory, such as one or more magnetic disk storage devices. Memory 610 may include mass storage that is remotely located from the CPU's 602. In some embodiments, memory 610 stores the following programs, modules and data structures, or a subset or superset thereof:

- an operating system 612 that includes procedures for handling various basic system services and for performing hardware dependent tasks;
- a network communication module 614 that is used for connecting the server 610 to the synchronizing server, the participating servers, and/or other computers via one or more communication networks (wired or wireless), such as the Internet, other wide area networks, local area networks, metropolitan area networks, and so on;
- a user interface module 616 configured to receive user inputs through the user interface 605;
- and a number of server-side application modules 618 including the following:
- a receiving module 310 configured to receive a joining request to add a new member to a chat group having one or more existing members, wherein the joining request is sent by a first mobile device associated with the new member using a barcode-scanning process or by a second mobile device associated with a first existing member using an existing-member-invitation process;
- an addition module 320 configured to add the new member to the chat group without further authorization from the existing members of the chat group;
- a determination module 330 configured to determine whether the new member is added to the chat group through the barcode-scanning process or the existing-member-invitation process;
- and a notifying module 340 configured to send corresponding notification messages to the existing members of the chat group based on whether the new member is added to the chat group through the barcode-scanning process or the existing-member-invitation process.

As indicated above, the barcode-scanning process may comprise: scanning a barcode encoding chat group information corresponding to the chat group using the first mobile device; decoding the barcode using a barcode decoding module to obtain the chat group information corresponding to the chat group; and generating the joining request based on the chat group information, and the existing-member-invitation process may comprise: sending an invitation to the new member to join the chat group using the second mobile device, wherein the new member has a direct-contact relationship with the first existing member; and generating the joining request based on the invitation.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for adding a new member to an instant messaging chat group, the method comprising:
at a server system having one or more processors and memory storing programs executed by the one or more processors:
receiving a joining request to add a new member to an instant messaging chat group having a plurality of currently existing members, including a first existing member, wherein the joining request is received from a mobile device associated with the first existing member using an existing-member-invitation process, wherein the existing-member-invitation process comprises: (i) sending an invitation to a mobile device associated with the new member to join the instant messaging chat group using the mobile device, wherein the new member has a direct-contact relationship with the first existing member; and (ii) generating the joining request based on the invitation;
determining whether a quantity of currently existing members in the plurality of currently existing members of the instant messaging chat group exceeds a threshold;
in accordance with a determination that the quantity of currently existing members of the instant messaging chat group does not exceed the threshold, adding the new member to the instant messaging chat group and sending a notification message to the mobile device associated with the new member without receiving further authorization from the plurality of currently existing members of the instant messaging chat group; and
in accordance with a determination that the quantity of currently existing members exceeds the threshold:
determining whether the new member has a direct-contact relationship with any existing members of the plurality of currently existing members other than the first existing member; and
in response to determining that the new member does not have a direct-contact relationship with any existing members of the plurality of currently existing members other than the first existing member, and without receiving any requests from the plurality of currently existing members, sending corresponding notification messages to each of the plurality of currently existing members of the instant messaging chat group, wherein each notification message includes: (i) information identifying the first existing member who sent the invitation to the new member to join the instant messaging chat group; (ii) information indicating that the new member does not have a direct-contact relationship with any existing members of the plurality of currently existing members other than the first existing member; and (iii) information that the new member was added to the instant messaging chat group by invitation, and sending a notification message to the mobile device associated with the new member.

2. The method of claim 1, wherein:
the direct-contact relationship is a direct-contact relationship associated with a chat program.

3. A server system for adding a new member to an instant messaging chat group, the server system comprising:
one of more processors;
memory storing one or more programs configured for execution by the one or more processors, the one or more programs including instructions for:
receiving a joining request to add a new member to an instant messaging chat group having a plurality of currently existing members, including a first existing member, wherein the joining request is received from a mobile device associated with a first existing member of the currently existing members using an existing-member-invitation process, wherein the existing-member-invitation process comprises: (i) sending an invitation to a mobile device associated with the new member to join the instant messaging chat group using the second mobile device, wherein the new member has a direct-contact relationship with the first existing member; and (ii) generating the joining request based on the invitation;
determining whether a quantity of currently existing members in the plurality of currently existing members of the instant messaging chat group exceeds a threshold;
in accordance with a determination that the quantity of currently existing members of the instant messaging chat group does not exceed the threshold, adding the new member to the instant messaging chat group and sending a notification message to the mobile device associated with the new member without receiving further authorization from the plurality of currently existing members of the instant messaging chat group; and
in accordance with a determination that the quantity of currently existing members exceeds the threshold:
determining whether the new member has a direct-contact relationship with any existing members of the plurality of currently existing members other than the first existing member; and
in response to determining that the new member does not have a direct-contact relationship with any existing members of the plurality of currently existing members other than the first existing member, and without receiving any requests from the plurality of currently existing members, sending corresponding notification messages to each of the plurality of currently existing members of the instant messaging chat group, wherein each notification message includes: (i) information identifying the first existing member who sent the invitation to the new member to join the instant messaging chat group; (ii) information indicating that the new member does not have a direct-contact relationship with any existing members of the plurality of currently existing members other than the first existing member; and (iii) information that the new member was added to the instant messaging chat group by invitation, and sending a notification message to the mobile device associated with the new member.

4. A non-transitory computer readable storage medium storing instructions for adding a new member to an instant messaging chat group, which, when executed by a server system, cause the server system to:
receive a joining request to add a new member to an instant messaging chat group having a plurality of currently existing members, including a first existing member, wherein the joining request is received from a mobile device associated with the first existing member using an existing-member-invitation process, wherein the existing-member-invitation process comprises: (i) sending an invitation to the new member to join the instant messaging chat group using the mobile device, wherein the new member has a direct-contact relationship with the first existing member; and (ii) generating the joining request based on the invitation;
determine whether a quantity of currently existing members in the plurality of currently existing members of the instant messaging chat group exceeds a threshold;
in accordance with a determination that the quantity of currently existing members of the instant messaging chat group does not exceed the threshold, add the new member to the instant messaging chat group and send a notification message to the mobile device associated with the new member without receiving further authorization from the plurality of currently existing members of the instant messaging chat group; and
in accordance with a determination that the quantity of currently existing members exceeds the threshold:
determine whether the new member has a direct-contact relationship with any existing members of the plurality of currently existing members other than the first existing member; and
in response to determining that the new member does not have a direct-contact relationship with any existing members of the plurality of currently existing members other than the first existing member, and without receiving any requests from the plurality of currently existing members, send corresponding notification messages to each of the plurality of currently existing members of the instant messaging chat group, wherein each notification message includes: (i) information identifying the first existing member who sent the invitation to the new member to join the instant messaging chat group; (ii) information indicating that the new member does not have a direct-contact relationship with any existing members of the plurality of currently existing members other than the first existing member; and (iii) information that the new member was added to the instant messaging chat group by invitation, and send a notification message to the mobile device associated with the new member.

5. The method of claim 1, further comprising:
in response to determining that the new member has a direct-contact relationship with at least one existing member of the plurality of currently existing members other than the first existing member, sending corresponding notification messages to each of the plurality of currently existing members of the instant messaging chat group, wherein each notification message includes: (i) information identifying the first existing member who sent the invitation to the new member to join the instant messaging chat group; (ii) information identifying the at least one existing member that has the direct-contact relationship with the new member; and (iii) information that the new member was added to the instant messaging chat group by invitation.

6. The server system of claim 3, wherein the one or more programs further include instructions for:

in response to determining that the new member has a direct-contact relationship with at least one existing member of the plurality of currently existing members other than the first existing member, sending corresponding notification messages to each of the plurality of currently existing members of the instant messaging chat group, wherein each notification message includes: (i) information identifying the first existing member who sent the invitation to the new member to join the instant messaging chat group; (ii) information identifying the at least one existing member that has the direct-contact relationship with the new member; and (iii) information that the new member was added to the instant messaging chat group by invitation.

7. The non-transitory computer readable storage medium of claim 4, wherein the non-transitory computer readable storage medium further stores instructions, which, when executed by the server system, cause the server system to:

in response to determining that the new member has a direct-contact relationship with at least one existing member of the plurality of currently existing members other than the first existing member, send corresponding notification messages to each of the plurality of currently existing members of the instant messaging chat group, wherein each notification message includes: (i) information identifying the first existing member who sent the invitation to the new member to join the instant messaging chat group; (ii) information identifying the at least one existing member that has the direct-contact relationship with the new member; and (iii) information that the new member was added to the instant messaging chat group by invitation.

\* \* \* \* \*